March 1, 1927.
J. H. GILLIES
DIRIGIBLE HEADLIGHT
Filed Feb. 15, 1926
1,619,068
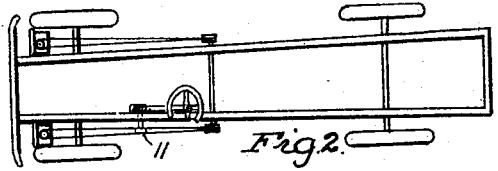
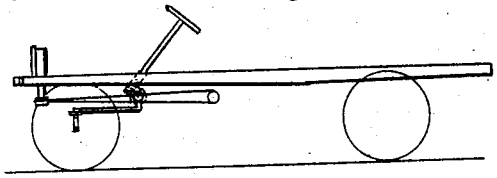
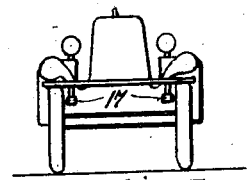
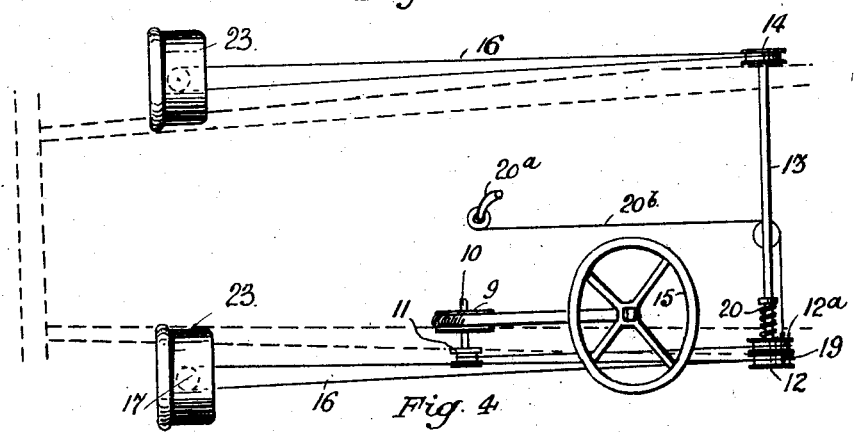
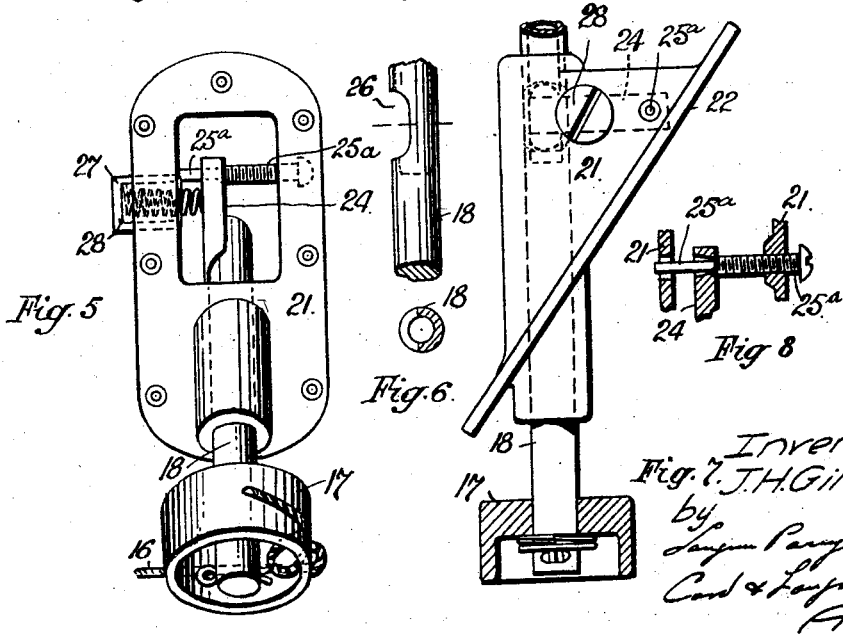

Patented Mar. 1, 1927.

1,619,068

UNITED STATES PATENT OFFICE.

JAMES HYNDES GILLIES, OF HOBART, TASMANIA, AUSTRALIA.

DIRIGIBLE HEADLIGHT.

Application filed February 15, 1926, Serial No. 88,680, and in Australia August 22, 1925.

This invention relates to the head lights of motor vehicles and has for its object to provide means whereby the lamps may be turned, through mechanism actuated from the steering means, in a direction in which the front wheels are moving in the vehicle.

According to the invention, the steering gear is employed to operate certain parts connected with the head lamps and to turn same in their mountings. The worm wheel spindle is used to support a small pulley over which a flexible wire cord is passed backwards in the vehicle to a pulley on a countershaft situated, preferably, just forward of the front universal joint. The countershaft is mounted transversely in the chassis and carries a second pulley on its other end. From the pulleys on the countershaft flexible wire cords pass forward to the lamp connections to rotate same as the front axle is turned.

Springs operate to steady the lamps and to assist to return the same when the vehicle is straightened after a turn and other improvements are included which will be hereinafter referred to with reference to the accompanying drawings, in which—

Fig. 1 is a side elevation showing the disposition of parts in a motor vehicle according to the invention.

Figs. 2 and 3 are respectively plan and end elevations of the same.

Fig. 4 is an enlarged plan view of same, but with a cut out driving pulley on the countershaft.

Fig. 5 is a rear elevation of a lamp bracket.

Fig. 6 shows in perspective view and sectional plan respectively portion of a lamp pillar.

Fig. 7 is a side elevation of a lamp bracket, and

Fig. 8 represents in sectional side elevation the lamp adjusting screw.

The preferred mode of operating the invention consists in utilizing the steering worm wheel 9 that is fitted with a short spindle 10 securely held on a bracket or in any convenient way upon the vehicle chassis frame. On the outer end of the spindle is a pulley 11 through which a flexible wire cord is passed, as in Fig. 5. This cord passes rearwardly to and over another pulley 12 on a countershaft 13 mounted in the machine chassis and on the other end of which is a like pulley 14. When the steering wheel 15 is rotated the worm and worm wheel 9 will rotate with it and also the spindle 10 through which the movements on the steering wheel will be communicated through the pulley and cord to the pulleys 12 and 14.

While the actuating means as above described is employed, it is desirable that the headlamps may be left as they are, but rotatable in their sockets so that same may be turned manually, when necessary, and without recourse to the means actuated through the steering mechanism. I thus provide on the countershaft 13 a second pulley 12$^a$ on which is a pin 19 that takes into an arc-shaped groove in the main pulley 12. The cut out pulley 12$^a$ is kept in mesh with pulley 12 by a compression spring 20 on the shaft 13 and can be withdrawn from pulley 12 by a hand or foot lever 20$^a$ connected by a cord 20$^b$. When the pulleys are not in mesh, the pulley 12$^a$ being free on the shaft, the lamps may be turned by hand to shed light at the rear of the vehicle. When the pulley 12$^a$ is employed the cord from the steering wheel spindle 10 will pass over it instead of over pulley 12 that will be driven by 12$^a$.

Flexible wire cords 16 are roven through and over pulleys 12 and 14 and pass forwardly to like pulleys 17 secured to the lamp pillars 18. The cords are fitted with means for taking up slack and for adjusting the tension of same. Each lamp pillar is mounted in a bracket 21 having a flange 22 by means of which it can be bolted to the skirt of the vehicle mudguard or fender and the upper end of each pillar is bored and tapped to receive the screw of the lamp 23. The bore is continued for a short distance below the point of intrusion of the lamp screw, and the side of the pillar at this part is removed, as shown in Fig. 6 for the purpose hereinafter explained.

The bracket 21 is hollow and in the hollow part a reaction plate 24 is fulcrumed on a rod 25$^a$. This rod passes through the walls of the bracket and is of larger diameter at one end than the other. The larger part 25$^a$ is screw threaded and the thread meshes with the like in one wall of the bracket. This part abuts against the plate 24 and the reduced part passes through the plate the opening in which is countersunk on the other side. The reaction plate 24 seats in the recess 26 in the pillar and is kept pressed thereagainst by the stout spring 27 in a box over which the cap 28 screws and by means of which the tension of the spring can be regulated.

The reaction plate bears upon the edges of the recessed hollow pillar, which thus presents a minimum of actual bearing surface but one that is well presented, efficient and less liable to wear untrue. The function of the plates 24 and springs 27 is to ensure that the lamps, when returned to their normal position, shall remain substantially fixed and unalterable in such positions until again deflected by the movements of the steering wheel.

Now, when the pulleys 17 are rotated the pillars and lamps will turn with the pillars and the plates 24 will be forced outwards from the pillars against the springs 27. Owing to the countersinking at the point where the fulcrum is situated the plate 24 is capable of a swinging movement while fulcrumed on the member 25ª but when the pulleys 17 are reversed on the steering wheel being turned to straighten the car after a turn has been effected, the reaction movement of the lamps and pillars will be assisted by the springs 27 and plates 24. The spring and plate also contribute to render the lamp stable and less susceptible to vibration.

The brackets are set, preferably, on the skirts of the front guards and the lower parts, including the pulleys 17, are below the same, as shown, to be as nearly as possible in line with the pulleys 12 and 14. The screw 25ª may be used to adjust the focus of the lamps which can be turned about the axes of their pillars by advancing or retarding the screw.

Thus, the head lights can be simultaneously turned and returned to shine constantly in the path in which the vehicle is moving without undue vibration or variation under running conditions. The operating parts are few and simply arranged and are not subject to excessive wear and tear.

Having now described my invention what I claim as new and desire to secure by Letters Patent is—

1. In vehicle head lamps, a shaft on the steering worm wheel, a pulley on the shaft, a countershaft and pulleys thereon operated from said worm wheel shaft, flexible wire cords on the worm wheel and countershaft pulleys, lamps on pillars on the vehicle body and a pulley on each lamp pillar over which a cord passes from a countershaft pulley, brackets on the vehicle body, a lamp and pillar in each bracket, a pulley on each lamp pillar over which a cord from a countershaft pulley passes, a recess at one side of each pillar, a reaction plate fulcrumed in each bracket and a spring held in each bracket that presses a plate against a pillar, the pillars that carry the lamps being made hollow to a point below the part recessed.

2. In vehicle head lamps, a countershaft that is operated from the steering mechanism of the vehicle, pulleys on said shaft and a flexible wire cord on each pulley, brackets on the vehicle body, a lamp and pillar in each bracket, a pulley on each lamp pillar over which a cord from a countershaft pulley passes, a recess at one side of each pillar, a reaction plate fulcrumed in each bracket and a spring held in each bracket that presses a plate against a pillar the latter being hollow to a point below the part recessed, a set screw of reduced diameter and having the thread removed, passing through a reaction plate, and on which same fulcrums, the plate being countersunk to its fulcrum.

In testimony whereof I have signed my name to this specification.

JAMES H. GILLIES.